United States Patent
Atkinson et al.

(10) Patent No.: US 11,709,928 B2
(45) Date of Patent: Jul. 25, 2023

(54) METHOD AND SYSTEM FOR SECURING ACCESS TO A PRIVATE KEY

(71) Applicant: JPMorgan Chase Bank, N.A., New York, NY (US)

(72) Inventors: Sean Atkinson, Glasgow (GB); David W Wagner, Glasgow (GB); Scott Alexander, Motherwell (GB)

(73) Assignee: JPMorgan Chase Bank, N.A., New York, NY (US)

( * ) Notice: Subject to any disclaimer, the term of this patent is extended or adjusted under 35 U.S.C. 154(b) by 138 days.

(21) Appl. No.: 17/325,678

(22) Filed: May 20, 2021

(65) Prior Publication Data

US 2021/0365547 A1   Nov. 25, 2021

Related U.S. Application Data

(60) Provisional application No. 63/028,893, filed on May 22, 2020.

(51) Int. Cl.
*G06F 21/46* (2013.01)
*G06F 21/60* (2013.01)

(52) U.S. Cl.
CPC ............ *G06F 21/46* (2013.01); *G06F 21/602* (2013.01)

(58) Field of Classification Search
None
See application file for complete search history.

(56) References Cited

U.S. PATENT DOCUMENTS

| | | | | |
|---|---|---|---|---|
| 6,834,112 | B1* | 12/2004 | Brickell | H04L 9/3236 380/279 |
| 9,258,122 | B1* | 2/2016 | Zhang | G06F 16/148 |
| 2008/0120504 | A1* | 5/2008 | Kirkup | H04L 9/003 713/176 |
| 2011/0185186 | A1* | 7/2011 | Adams | H04W 12/02 380/279 |
| 2013/0145170 | A1* | 6/2013 | Rese | G06F 21/40 713/183 |
| 2015/0113279 | A1* | 4/2015 | Andersen | G06F 21/6218 713/171 |
| 2016/0359621 | A1* | 12/2016 | Lin | H04L 9/32 |
| 2018/0212772 | A1* | 7/2018 | Leavy | H04L 9/3247 |
| 2018/0234237 | A1* | 8/2018 | Ye | H04L 9/0891 |
| 2018/0254898 | A1* | 9/2018 | Sprague | H04L 9/006 |
| 2019/0140825 | A1* | 5/2019 | Sullivan | H04L 9/0861 |
| 2019/0340393 | A1* | 11/2019 | Mo | G06F 21/554 |

(Continued)

*Primary Examiner* — James R Turchen
(74) *Attorney, Agent, or Firm* — Greenblum & Bernstein, P.L.C.

(57) ABSTRACT

An asymmetric cryptographic method for securing access to a private key generated and stored in a device is provided. The method includes generating an application password relating to a predetermined level of entropy; generating, within a trusted execution environment relating to a key manager, a user private key secured by using the application password; receiving, from a user via an input device, user entropy relating to a unique identifier for the user; deriving, using a password derivation function, a symmetric key based on the user entropy; encrypting, using an encryption system, the application password by using the symmetric key; and storing, in a memory, a device payload component relating to the application password and the symmetric key in a password management system.

18 Claims, 9 Drawing Sheets

(56) References Cited

U.S. PATENT DOCUMENTS

| | | | |
|---|---|---|---|
| 2020/0259637 A1* | 8/2020 | Spohn | H04L 9/0643 |
| 2021/0004454 A1* | 1/2021 | Chester | H04L 63/0807 |
| 2021/0091950 A1* | 3/2021 | Asher | H04L 9/0877 |
| 2022/0245631 A1* | 8/2022 | Cui | H04L 9/3247 |

* cited by examiner

METHOD AND SYSTEM FOR SECURING ACCESS TO A PRIVATE KEY

CROSS-REFERENCE TO RELATED APPLICATIONS

This application claims the benefit of U.S. Provisional Patent Application Ser. No. 63/028,893, filed May 22, 2020, which is hereby incorporated by reference in its entirety.

BACKGROUND

1. Field of the Disclosure

This technology generally relates to methods and systems for securing access to a private key, and more particularly to methods and systems of asymmetric cryptography for securing access to a private key generated and stored within a trusted execution environment of a device.

2. Background Information

Many business entities use a server-side symmetric key generation technique to generate symmetric keys to encrypting data intended for, and potentially stored on, a user's device. The symmetric keys may be unique to a specific user on a specific device and may be retrieved once the user has been authenticated. Historically, such server-side symmetric key generation techniques have resulted in varying degrees of success with respect to securing transmitted data.

One drawback of using conventional server-side symmetric key generation techniques is that in many instances, the data encrypted with the symmetric keys may be at risk of unauthorized access when malicious actors gain access to the data and the symmetric keys. The increased risk of unauthorized access is caused by the exposure of the symmetric keys due to the storage of the symmetric keys in many devices as well as the transmission of the symmetric keys between those devices. As a result, while many steps may be implemented to further encrypt the symmetric keys for transmission, the exposure of the symmetric keys presents as a potential attack vector.

Therefore, there is a need for a method to securely access an asymmetric key pair stored in a device, where a private key of the key pair is generated inside of a trusted execution environment and access to the private key is governed by various user entropy mechanisms.

SUMMARY

The present disclosure, through one or more of its various aspects, embodiments, and/or specific features or sub-components, provides, inter alia, various systems, servers, devices, methods, media, programs, and platforms of asymmetric cryptography for securing access to a private key generated and stored within a trusted execution environment of a device.

According to an aspect of the present disclosure, a cryptographic method for securing access to a private key generated and stored in a device is provided. The method is implemented by at least one processor. The method includes generating at least one application password relating to a predetermined level of entropy; generating, within a trusted execution environment relating to a key manager in a secure area of the at least one processor, at least one user private key secured by using the at least one application password; receiving, from a user via an input device, at least one user entropy relating to a unique identifier for the user; deriving, using a password derivation function, at least one symmetric key based on the at least one user entropy; encrypting, using an encryption system, the at least one application password by using the at least one symmetric key; and storing, in a memory, at least one device payload component relating to the at least one application password and the at least one symmetric key in a password management system.

In accordance with an exemplary embodiment, the method may further include receiving, via a communication interface, at least one request to use the user private key, the at least one request may include the at least one user entropy and at least one action; deriving, by using the password derivation function, the at least one symmetric key based on the received at least one user entropy; decrypting, using the encryption system, the at least one application password by using the derived at least one symmetric key; retrieving, from within the trusted execution environment, reference information relating to the at least one user private key by using the decrypted at least one application password; and using the reference information to instruct the trusted execution environment to perform the action.

In accordance with an exemplary embodiment, the at least one user private key may remain within the trusted execution environment.

In accordance with an exemplary embodiment, the trusted execution environment may include a hardware-based key manager that is isolated from the at least one processor.

In accordance with an exemplary embodiment, the password management system may include a device keychain.

In accordance with an exemplary embodiment, the at least one user entropy may include at least one from among a username, a password, a randomly generated password from an authenticated request, and a randomly generated password that is accessible when user presence has been verified via biometrics.

In accordance with an exemplary embodiment, the method may further include generating, within a trusted execution environment, a device secret key that is shared by all users of the device; deriving the at least one symmetric key based on a random device password that is protected by the device secret key and a password that is protected by the at least one user entropy; receiving, via a communication interface, at least one wipe request to destroy data that correspond to the user; and deleting, via the trusted execution environment, at least one from among the user private key, the device secret key, and an application secret key that corresponds to the at least one wipe request to prevent decryption of the data.

In accordance with an exemplary embodiment, the at least one wipe request may include at least one from among a single-user wipe request to destroy a first data set that is associated with a single user, a multi-user wipe request to destroy a second data set that is associated with a plurality of users of the device, and a per application wipe request to destroy a third data set that is associated with an application.

In accordance with an exemplary embodiment, the at least one user private key remains accessible in the trusted execution environment by using an alternate source of user entropy when the unique identifier that corresponds to the user is changed.

In accordance with an exemplary embodiment, the server recovery key may be obtained from a networked repository by using at least one authentication technique to validate the user identity, the at least one authentication technique including a multi-factor authentication technique.

According to an aspect of the present disclosure, a computing device configured to implement an execution of a cryptographic method for securing access to a private key generated and stored in a device is disclosed. The computing device comprising a processor; a memory; and a communication interface coupled to each of the processor and the memory, wherein the processor may be configured to generate at least one application password relating to a predetermined level of entropy; generate, within a trusted execution environment relating to a key manager in a secure area of the processor, at least one user private key secured by using the at least one application password; receive, from a user via an input device, at least one user entropy relating to a unique identifier for the user; derive, by using a password derivation function, at least one symmetric key based on the at least one user entropy; encrypt, by using an encryption system, the at least one application password by using the at least one symmetric key; and store, in the memory, at least one device payload component relating to the at least one application password and the at least one symmetric key in a password management system.

In accordance with an exemplary embodiment, the processor may be further configured to receive, via the communication interface, at least one request to use the user private key, the at least one request may include the at least one user entropy and at least one action; derive, by using the password derivation function, the at least one symmetric key based on the received at least one user entropy; decrypt, by using the encryption system, the at least one application password by using the derived at least one symmetric key; retrieve, from within the trusted execution environment, reference information relating to the at least one user private key by using the decrypted at least one application password; and use the reference information to instruct the trusted execution environment to perform the action.

In accordance with an exemplary embodiment, the processor may be further configured to retain the at least one user private key within the trusted execution environment.

In accordance with an exemplary embodiment, the trusted execution environment may include a hardware-based key manager that is isolated from the at least one processor.

In accordance with an exemplary embodiment, the password management system may include a device keychain.

In accordance with an exemplary embodiment, the at least one user entropy may include at least one from among a username, a password, a randomly generated password from an authenticated request, and a randomly generated password that is accessible when user presence has been verified via biometrics.

In accordance with an exemplary embodiment, the processor may be further configured to generate, within a trusted execution environment, a device secret key that is shared by all users of the device; derive the at least one symmetric key based on a random device password that is protected by the device secret key and a password that is protected by the at least one user entropy; receive, via the communication interface, at least one wipe request to destroy data that correspond to the user; and delete, via the trusted execution environment, at least one from among the user private key, the device secret key, and an application secret key that corresponds to the at least one wipe request to prevent decryption of the data.

In accordance with an exemplary embodiment, the at least one wipe request may include at least one from among a single-user wipe request to destroy a first data set that is associated with a single user, a multi-user wipe request to destroy a second data set that is associated with a plurality of users of the device, and a per application wipe request to destroy a third data set that is associated with an application.

In accordance with an exemplary embodiment, the processor may be further configured to retain access to the at least one user private key in the trusted execution environment by using an alternate source of user entropy when the unique identifier that corresponds to the user is changed.

In accordance with an exemplary embodiment, the processor may be further configured to obtain the server recovery key from a networked repository by using at least one authentication technique to validate the user identity, the at least one authentication technique including a multi-factor authentication technique.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
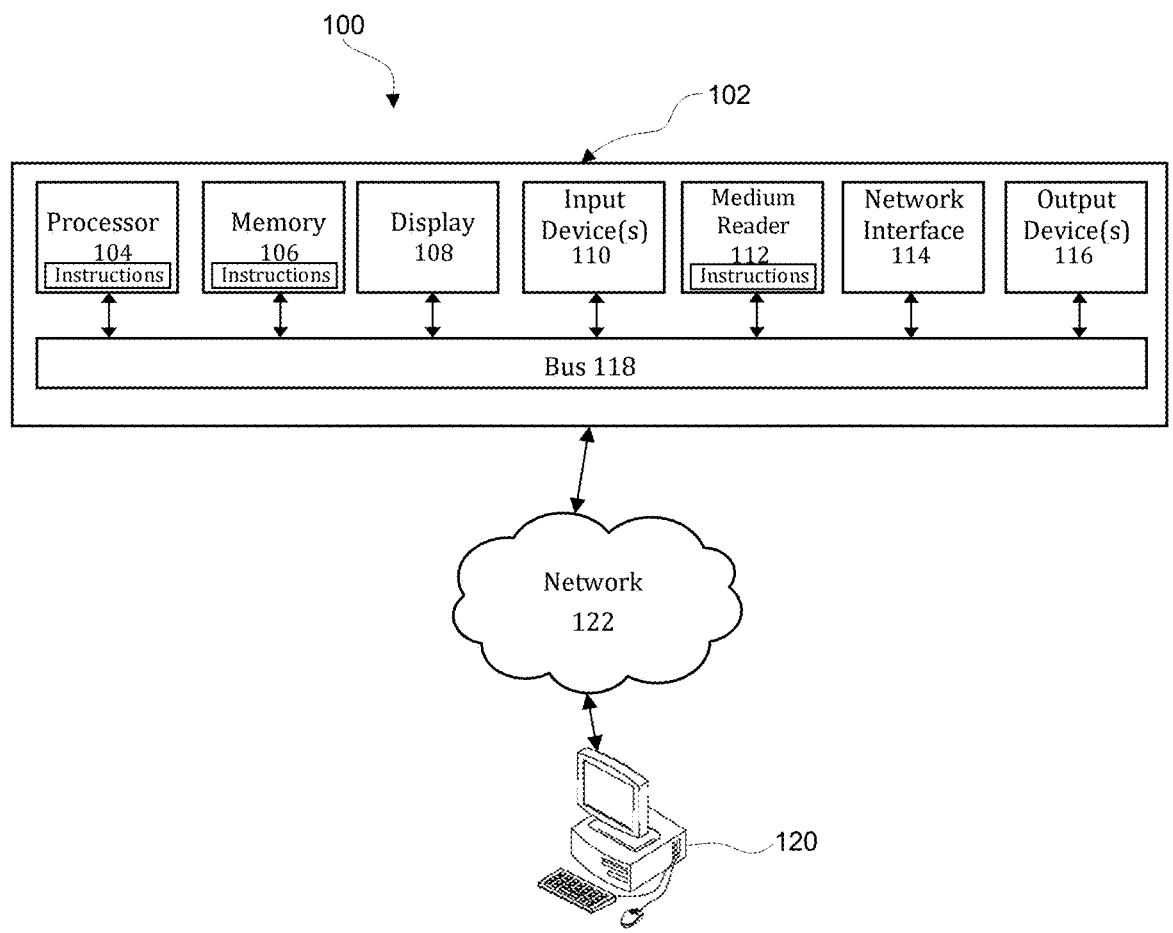
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote-control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems of asymmetric cryptography for securing access to a private key generated and stored within a trusted execution environment of a device.

Figure 2:
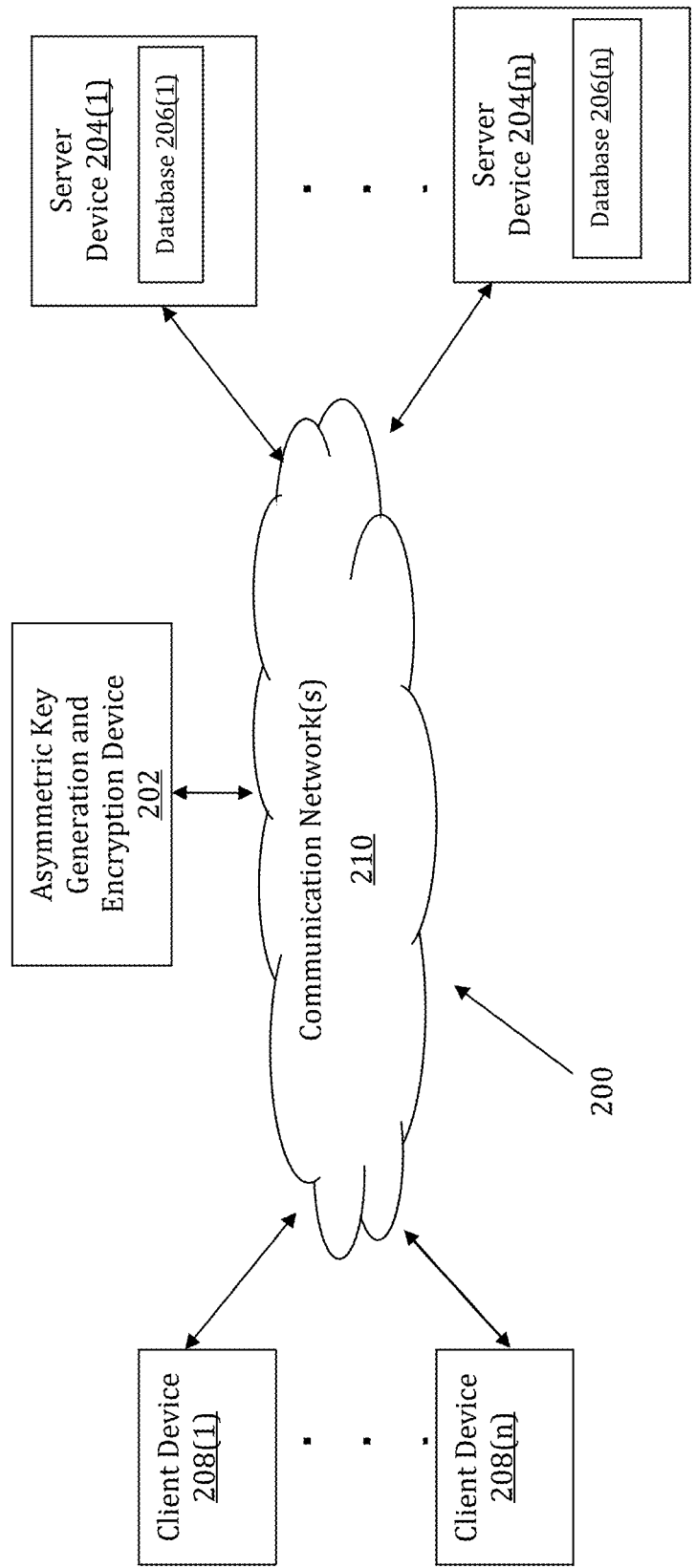
FIG. 2 illustrates an exemplary diagram of a network environment.

Referring to FIG. 2, a schematic of an exemplary network environment 200 for implementing a method of asymmetric cryptography for securing access to a private key generated and stored within a trusted execution environment of a device is illustrated. In an exemplary embodiment, the method is executable on any networked computer platform, such as, for example, a personal computer (PC).

The method of asymmetric cryptography for securing access to a private key generated and stored within a trusted execution environment of a device may be implemented by an Asymmetric Key Generation and Encryption (AKGE) device 202. The AKGE device 202 may be the same or similar to the computer system 102 as described with respect to FIG. 1. The AKGE device 202 may store one or more applications that can include executable instructions that, when executed by the AKGE device 202, cause the AKGE device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the AKGE device 202 itself, may be located in virtual server(s) running in a cloud-based computing environment rather than being tied to one or more specific physical network computing devices. Also, the application(s) may be running in one or more virtual machines (VMs) executing on the AKGE device 202. Additionally, in one or more embodiments of this technology, virtual machine(s) running on the AKGE device 202 may be managed or supervised by a hypervisor.

In the network environment 200 of FIG. 2, the AKGE device 202 is coupled to a plurality of server devices 204(1)-204(n) that hosts a plurality of databases 206(1)-206(n), and also to a plurality of client devices 208(1)-208(n) via communication network(s) 210. A communication interface of the AKGE device 202, such as the network interface 114 of the computer system 102 of FIG. 1, operatively couples and communicates between the AKGE device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the AKGE device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and AKGE devices that efficiently implement a method of asymmetric cryptography for securing access to a private key generated and stored within a trusted execution environment of a device.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The AKGE device 202 may be a standalone device or integrated with one or more other devices or apparatuses, such as one or more of the server devices 204(1)-204($n$), for example. In one particular example, the AKGE device 202 may include or be hosted by one of the server devices 204(1)-204($n$), and other arrangements are also possible. Moreover, one or more of the devices of the AKGE device 202 may be in a same or a different communication network including one or more public, private, or cloud networks, for example.

The plurality of server devices 204(1)-204($n$) may be the same or similar to the computer system 102 or the computer device 120 as described with respect to FIG. 1, including any features or combination of features described with respect thereto. For example, any of the server devices 204(1)-204($n$) may include, among other features, one or more processors, a memory, and a communication interface, which are coupled together by a bus or other communication link, although other numbers and/or types of network devices may be used. The server devices 204(1)-204($n$) in this example may process requests received from the AKGE device 202 via the communication network(s) 210 according to the HTTP-based and/or JavaScript Object Notation (JSON) protocol, for example, although other protocols may also be used.

The server devices 204(1)-204($n$) may be hardware or software or may represent a system with multiple servers in a pool, which may include internal or external networks. The server devices 204(1)-204($n$) hosts the databases 206(1)-206($n$) that are configured to store data that relates to device keychain payloads, device keychain asymmetric keys, and static keys.

Although the server devices 204(1)-204($n$) are illustrated as single devices, one or more actions of each of the server devices 204(1)-204($n$) may be distributed across one or more distinct network computing devices that together comprise one or more of the server devices 204(1)-204($n$). Moreover, the server devices 204(1)-204($n$) are not limited to a particular configuration. Thus, the server devices 204(1)-204($n$) may contain a plurality of network computing devices that operate using a master/slave approach, whereby one of the network computing devices of the server devices 204(1)-204($n$) operates to manage and/or otherwise coordinate operations of the other network computing devices.

The server devices 204(1)-204($n$) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208($n$) may also be the same or similar to the computer system 102 or the computer device 120 as described with respect to FIG. 1, including any features or combination of features described with respect thereto. For example, the client devices 208(1)-208($n$) in this example may include any type of computing device that can interact with the AKGE device 202 via communication network(s) 210. Accordingly, the client devices 208(1)-208($n$) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208($n$) may run interface applications, such as standard web browsers or standalone client applications, which may provide an interface to communicate with the AKGE device 202 via the communication network(s) 210 in order to communicate user requests and information. The client devices 208(1)-208($n$) may further include, among other features, a display device, such as a display screen or touchscreen, and/or an input device, such as a keyboard, for example.

Although the exemplary network environment 200 with the AKGE device 202, the server devices 204(1)-204($n$), the client devices 208(1)-208($n$), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the AKGE device 202, the server devices 204(1)-204($n$), or the client devices 208(1)-208($n$), for example, may be configured to operate as virtual instances on the same physical machine. In other words, one or more of the AKGE device 202, the server devices 204(1)-204($n$), or the client devices 208(1)-208($n$) may operate on the same physical device rather than as separate devices communicating through communication network(s) 210. Additionally, there may be more or fewer AKGE devices 202, server devices 204(1)-204($n$), or client devices 208(1)-208($n$) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
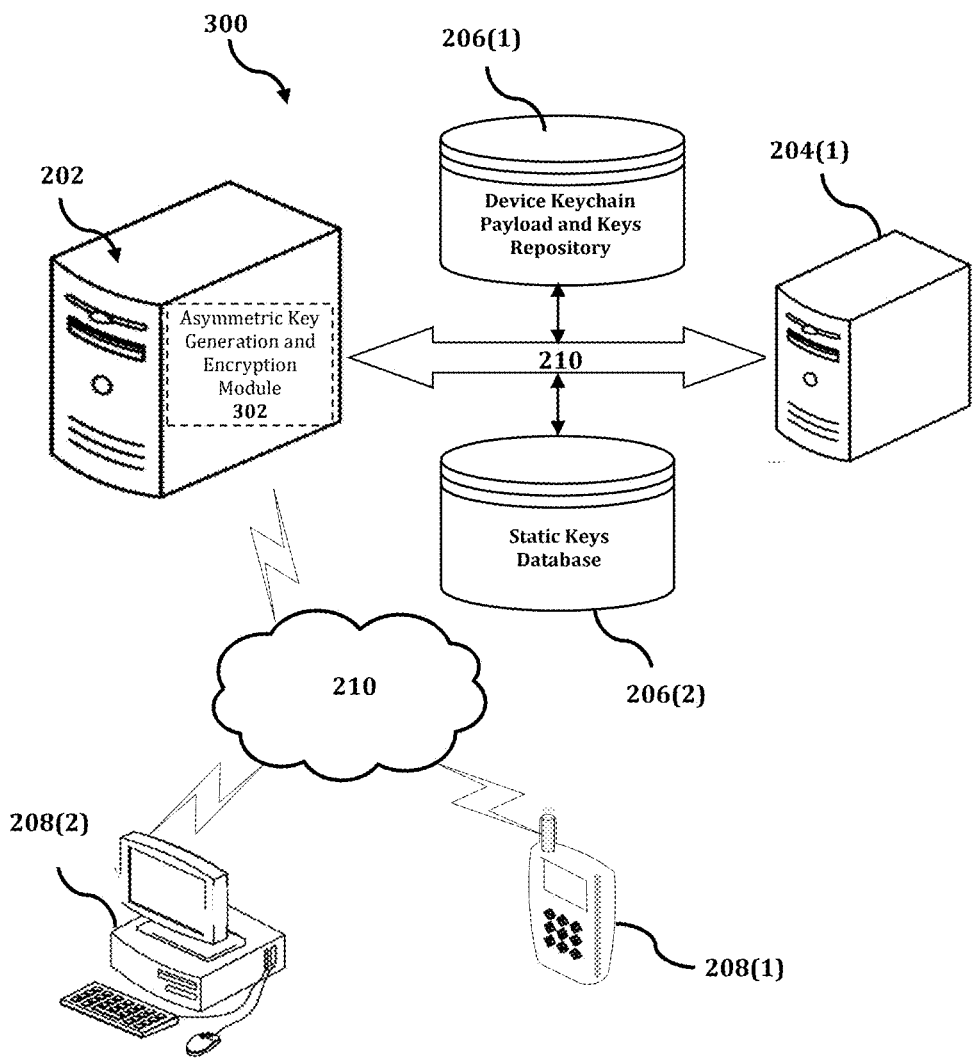
FIG. 3 shows an exemplary system for implementing a method of asymmetric cryptography for securing access to a private key generated and stored within a trusted execution environment of a device.

The AKGE device 202 is described and shown in FIG. 3 as including an asymmetric key generation and encryption module 302, although it may include other rules, policies, modules, databases, or applications, for example. As will be described below, the asymmetric key generation and encryption module 302 is configured to implement a method of asymmetric cryptography for securing access to a private key generated and stored within a trusted execution environment of a device.

An exemplary process 300 for implementing a mechanism of asymmetric cryptography for securing access to a private key generated and stored within a trusted execution environment of a device by utilizing the network environment of FIG. 2 is shown as being executed in FIG. 3. Specifically, a first client device 208(1) and a second client device 208(2) are illustrated as being in communication with AKGE device 202. In this regard, the first client device 208(1) and the second client device 208(2) may be "clients" of the AKGE device 202 and are described herein as such. Nevertheless, it is to be known and understood that the first client device 208(1) and/or the second client device 208(2) need not necessarily be "clients" of the AKGE device 202, or any entity described in association therewith herein. Any additional or alternative relationship may exist between either or both of the first client device 208(1) and the second client device 208(2) and the AKGE device 202, or no relationship may exist.

Further, AKGE device 202 is illustrated as being able to access a device keychain payload and keys repository 206(1) and a static keys database 206(2). The asymmetric key generation and encryption module 302 may be configured to access these databases for implementing a method of asymmetric cryptography for securing access to a private key generated and stored within a trusted execution environment of a device.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the AKGE device 202 via broadband or cellular communication. Of course, these embodiments are merely exemplary and are not limiting or exhaustive.

Upon being started, the asymmetric key generation and encryption module 302 executes a process of asymmetric cryptography for securing access to a private key generated and stored within a trusted execution environment of a device. An exemplary process of asymmetric cryptography for securing access to a private key generated and stored within a trusted execution environment of a device is generally indicated at flowchart 400 in FIG. 4 and flowchart 500 in FIG. 5.

Establishing a Private Key and Securely Accessing the Private Key

A new asymmetric key for a device may be established when an application is started for the first time in a device. In another exemplary embodiment, a new asymmetric key for a device may be established when the device has been completely wiped of data. Below, an exemplary process for establishing a new asymmetric key in a device is provided.

Figure 4:
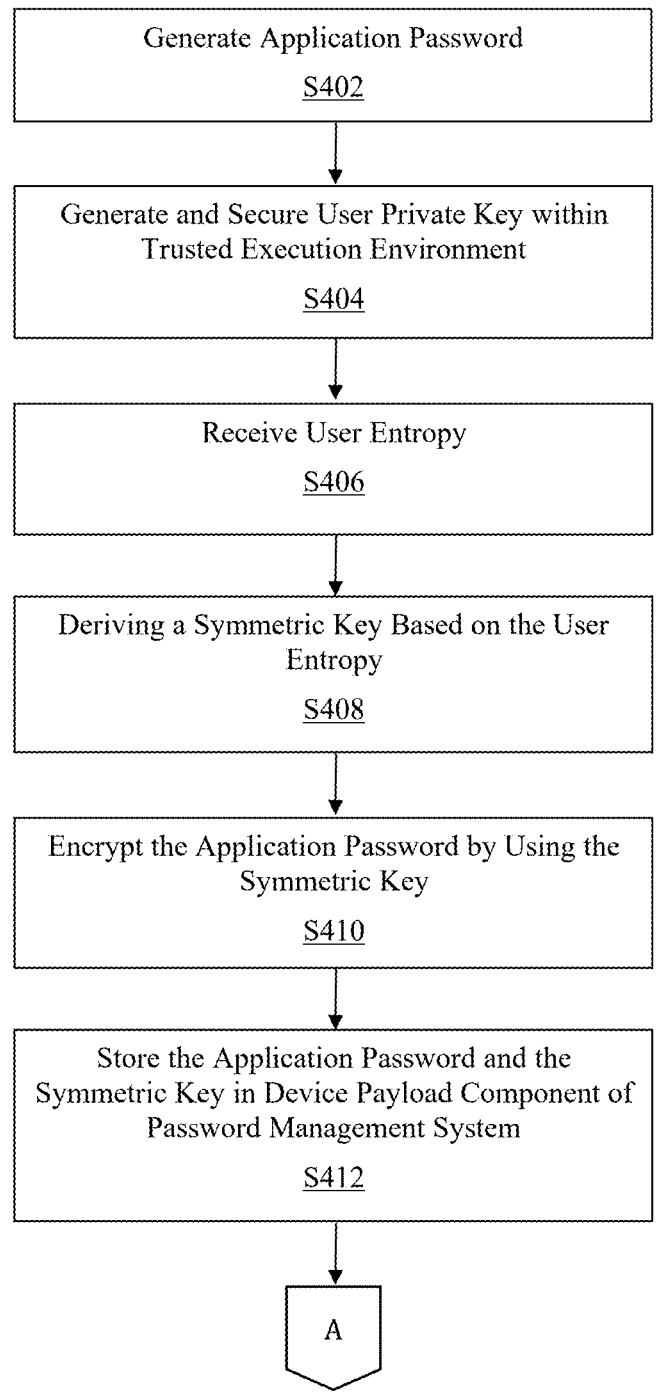
FIG. 4 is a flowchart of an exemplary process for implementing a method of asymmetric cryptography for generating and securing access to a private key stored within a trusted execution environment of a device.

In the process 400 of FIG. 4, at step S402, an application password relating to a predetermined level of entropy may be generated. Then, at step S404, a user private key may be generated within a trusted execution environment relating to a key manager in a secure area of the processor. The user private key may be secured by using the application password. In another exemplary embodiment, the ability to generate a private key such as, for example, the user private key may be provided by a platform such as, for example, the encryption schema of an operating system. The platform may generate the private key within a trusted execution environment of a device based on instructions provided by a program such as, for example, an application. In another exemplary embodiment, the private key remains in the trusted execution environment and does not leave the device. Applications on the device may access reference information of the private key to perform actions without access to the private key.

At step S406, user entropy relating to a unique user identifier may be received from a user via an input device. The user entropy may include any parameter such as, for example, a username, a user password, a randomly generated password stored on a server and only available via an authenticated request, and a randomly generated password stored in the keychain protected with biometrics, which identifies the user.

At step S408, a symmetric key based on the at least one user entropy may be derived by using a key derivation function. Then, at step S410, the application password may be encrypted by using an encryption system and the symmetric key. The encryption system may be a secure system for protecting the application password by using the symmetric key as an input. In another exemplary embodiment, the encryption system may include at least one of directly encrypting the password with the symmetric key by using advanced encryption standard Galois/Counter mode (AES-GCM), directly encrypting the application password with the symmetric key using advanced encryption standard cypher block chaining (AES-CBC), and indirectly encrypting the password by generating another private key in the trusted execution environment protected with the symmetric key using the application password functionality and using the another private key, and corresponding public key, to encrypt/decrypt the application password. Then, at step S412, a device payload component relating to the application password and the symmetric key may be stored in a password management system.

Figure 5:
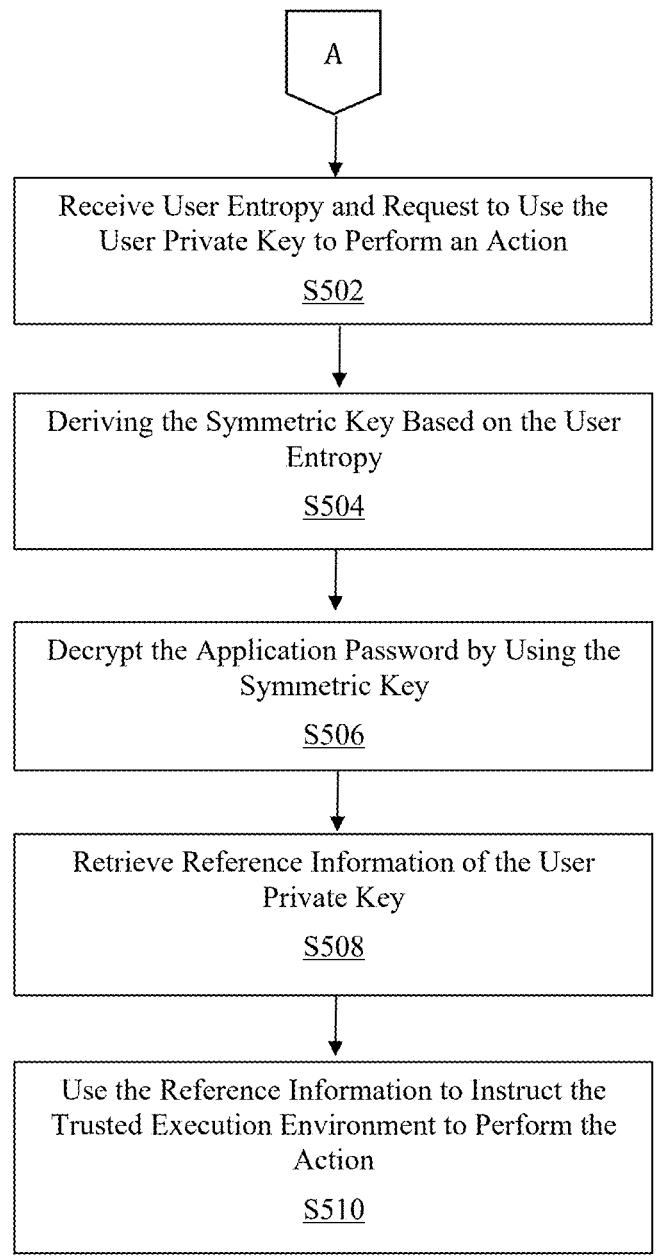
FIG. 5 is a flowchart of an exemplary process for implementing a method of asymmetric cryptography for retrieving for use, a reference to a securely stored private key generated and stored within a trusted execution environment of a device.

Further, in the process 500 of FIG. 5 at step S502, a request to use the user private key may be received via a communication interface. The request may include the user entropy and an action. In an exemplary embodiment, the request may be received from an application in the device or an application communicating with the device via the communication interface. The request may include an action such as, for example, a request by the application to use the private key to decrypt received data.

At step S504, the symmetric key based on the received user entropy may be derived by using the key derivation function. The key derivation function may use as input the received user entropy from the request to derive the symmetric key. Then, at step S506, the application password may be decrypted by the encryption system using the derived symmetric key.

At step S508, reference information relating to the user private key may be retrieved from within the trusted execution environment by using the decrypted application password. The reference information may be used by the application in place of the user private key such that the application does not have access to the user private key. Then, at step S510, the reference information may be used to instruct the trusted execution environment to perform the requested action.

In another exemplary embodiment, the at least one user entropy may be combined as input to the Key Derivation function with another value, derived through an exemplary embodiment, and only derivable in a way that requires the device in use and that can be irrevocably prevented at a future point in time. Prevention should render the value underivable and thus cannot then be used as input to the Key Derivation function, rendering the derived Symmetric Key also underivable. To achieve this, a device master key password may be generated by a device processor at application start-up. In an exemplary embodiment, the device master key password may include a random and arbitrary string of characters such as, for example, letters, numbers, and symbols. Characteristics of the device master key such as, for example, a required length of the password and a composition of the password may be predetermined by an operating entity based on at least one from among a business requirement, a technology standard, and a system requirement. As will be appreciated by a person of ordinary skill in the art, a processor may randomly generate a password by using at least one of a plurality of standard cryptographic techniques.

In another exemplary embodiment, the device processor may, within a trusted execution environment relating to a key manager in a secure area of the device processor, generate a device master key relating to a device private key and encrypt the device master key by using the device master key password. The trusted execution environment may include a secure area of a processor and may run in parallel of the operating system in an isolated environment. The trusted execution environment may also include a hardware-based key manager such as, for example, a secure enclave that may be isolated from the at least one processor.

In another exemplary embodiment, the device master key may include a randomly generated password based on predefined criteria. The device private key may include a device specific private key such as, for example, a secret key of a key pair such as an asymmetric key pair. The device private key may serve as a variable in cryptography and may be used with an algorithm to encrypt and decrypt code. As will be appreciated by a person of skill in the art, the encryption of data may translate data into another form, or code, so that only people with access to a secret key may read the data. The encryption process may include an encryption solution such as, for example, a Triple Data Encryption Standard (Triple DES) algorithm, a Rivest-Shamire-Adleman (RSA) algorithm, a Blowfish algorithm, a Twofish algorithm, and an Advanced Encryption Standard (AES) algorithm.

In another exemplary embodiment, a DevicePassword may be generated by the device processor. The DevicePassword may include at least one from among a key from a generated key pair, a signature generated from a private key and a known input, and a randomly generated password based on predefined criteria. Then, in another exemplary embodiment, the DevicePassword may be encrypted by using the device master key.

In another exemplary embodiment, the DevicePassword may be stored in a device payload component of a password management system. The device payload component may include a device specific payload component of data containing the actual data without header information. In an exemplary embodiment, the password management system may include software such as, for example, a device keychain for the management of passwords on a particular device as well as across multiple devices. As will be appreciated by a person of ordinary skill in the art, the storing of data in a password management system may include any physical device capable of storing information temporarily as well as storing information permanently on a computing device.

After which, in another exemplary embodiment, a device master key password key may be generated by the device processor. The device master key password key may include a randomly generated password based on predefined criteria. Then, in another exemplary embodiment, the device master key password may be encrypted by using the device master key password key.

In another exemplary embodiment, the device master key password key may be encrypted by using a static key. In an exemplary embodiment, the static key may include a key intended to be used for a long period of time and may typically be intended for use in many instances of a cryptographic key-establishment scheme. In another exemplary embodiment, the static key may be stored within another networked device such as, for example, a server device in an obfuscation cryptographic system such as, for example, a hardware-based obfuscation system and a software-based obfuscation system as well as a white-box cryptographic system. Then, in another exemplary embodiment, the encrypted device master key password and the encrypted device master key password key may be stored in the password management system.

In another exemplary embodiment, a username and a user password may be received from a user via a graphical user interface. The username may include an identification used by a person for access to a computer, a network, and an online service. In an exemplary embodiment, the username may include predefined characters such as, for example, letters, numbers, and symbols and may include predefined criteria such as, for example, a required length. In another exemplary embodiment, the user password may include predefined characters such as, for example, letters, numbers, and symbols and may include predefined criteria such as, for example, a required length. As will be appreciated by a person of skill in the art, the graphical user interface may include a visual way of interacting with a computer using items such as, for example, windows, icons, and menus utilized by operating systems.

In another exemplary embodiment, a user device master key password relating to the user and the device may be generated. The user device master key password may include a randomly generated password based on predefined criteria. In an exemplary embodiment, the user device master key password may be unique for a specific user of a specific user device.

In another exemplary embodiment, the device processor may, within the trusted execution environment, generate a user master key relating to a user private key and encrypt the user master key by using the user device master key password. The user master key may include a private key of a generated key pair and may serve as a primary master key for the user on the user device. In an exemplary embodiment, the user master key may not enter a memory of an application and may not leave the user device. The user private key may include a user specific private key such as, for example, a secret key of a key pair such as an asymmetric key pair. The user private key may serve as a variable in cryptography and may be used with an algorithm to encrypt and decrypt code.

In another exemplary embodiment, a derived symmetric key may be derived using a key derivation function based on the username, the user password, and the DevicePassword. The derived symmetric key may include a secret key derived using the key derivation function. The key derivation function may include a pseudorandom cryptographic function for deriving one or more secret keys such as, for example, a master key, a password, and a passphrase from a secret value.

Recovering Keys after User Credentials Change

On device keys may be recovered when a user's credentials change. The user's credentials may change due to an action by the user such as, for example, the user changing a user password as well as change due to an action by the operating entity such as, for example, the operating entity updating a username. Below, an exemplary process for recovering a key when a user's credentials change is provided.

In an exemplary embodiment, the user device may randomly generate a Universally Unique Identifier (UUID). The device UUID may be included in an authenticated network request for the server recovery key. The authenticated network request may be encrypted by using an ephemeral Advanced Encryption Standard (AES) key. The encrypted authenticated network request may then be included in a payload, which may be encrypted by using the public key of the server device receiving the payload. In an exemplary embodiment, the ephemeral AES key may be encrypted with the server public key.

The server device may then use a server device private key to decrypt the ephemeral AES key. The server device may then decrypt the payload by using the decrypted ephemeral transport key. A server recovery key may be generated by the server device. The server device may also store the server recovery key, the ephemeral AES key, and the payload on a memory.

The server may then encrypt the server recovery key by using the ephemeral AES key and send the encrypted server recovery key back to the user device. The user device may decrypt the server recovery key and may derive a server recovery access key password by using a key derivation function based on inputs of the server recovery key and the device secret key.

A private key may then be generated within the trusted execution environment and the private key may be encrypted by using the server recovery access key password. The decrypted user device master key password may be re-encrypted and stored back in a password management system.

The user device may then wait until the next time the user attempts to log in to the device after the user has changed the user password. After the user device fails to derive the user offline access key password, the device may detect a network connection and may transmit an authenticated and encrypted request to the server device. The request may include relevant user information and device information such as, for example, a device identification information.

After receiving the request, the server device may respond by transmitting the server recovery key to the user device. The user device may use the server recovery key to gain access to the user device master key password. Once access to the user device master key password has been achieved, the user device may delete the user offline access key password and the user offline access key to generate a new user offline access key password and a new user offline access key. The user device master key password may then be encrypted by using the new user offline access key. The new user offline access key may enable offline access for the user based on the new credentials.

Wiping Data

An entity may require the ability to wipe data such as, for example, all stored keys from a user device. The entity may want to wipe all data from a user device in situations such as, for example, when an issue is detected with components of the user device, when a malware event is detected on the user device, and when the entity has detected that the user is in breach of predetermined and agreed upon operational policies. Below, exemplary processes for wiping all data from a user device is provided. These exemplary processes may be implemented as additional features of previously described disclosures in the present application.

In an exemplary embodiment, a wipe of a single user in a single application (app) may be accomplished whilst maintaining the data of other applications (apps), and other users in the same application, on the same device. For this exemplary embodiment, the user may have multiple applications on the device, the user may have established and used a unique private key, and the private key may be established in an area of the trusted execution environment that is shared by multiple applications enabling the multiple applications to access the private key.

To establish a private key, the device may generate a random password such as, for example, a UserAppPrivateKeyPassword and an app password of appropriate entropy; generate a stored private key such as, for example, a UserAppPrivateKey in the trusted execution environment of the device, private to the application performing the establishment, and additionally protected by the random password; and use any encryption system of appropriate security to directly or indirectly encrypt the random password with the corresponding public key of the UserPrivateKey, which was established via the steps outlined previously in the present application and store the encrypted payload.

To access and use the private key, the device may follow the steps outlined previously in the present application to gain access to the UserPrivateKey; retrieve the encrypted password from the keychain and use the encryption system to decrypt the password using the UserPrivateKey; retrieve reference information relating to the UserAppPrivateKey providing the decrypted password; and use the UserAppPrivateKey by utilizing the reference information.

To wipe information for one user in one application, the device may instruct the trusted execution environment to delete the stored private key such as, for example, the UserAppPrivateKey for the targeted application. By deleting the UserAppPrivateKey, any data encrypted with the key, either directly or indirectly, may no longer be accessible. Simultaneously, the UserPrivateKey shared across all apps and the UserAppPrivateKey(s) of all other apps may remain active enabling all other apps to continue unaffected. Further, other user keys may also remain active on the device enabling other users, who are utilizing the same app on the same device, to continue to use the app.

In another exemplary embodiment, a wipe of all user keys at a device level may be enabled when multiple users are using a shared device. For this exemplary embodiment, multiple users may establish at least one unique private key in the trusted execution environment of a shared device using disclosures previously described in the present application.

To establish a private key, when a key is not already present in the trusted execution environment, the device may generate a stored private key such as, for example, a DevicePrivateKey in the trusted execution environment of the device. The private key may not be protected with additional mechanisms such as, for example, an app password. The private key may be shared by all users on the device. The device may perform this step when the private key has not already been generated by a previous execution or the previously established private key has been deleted. When a random password is not already present, generate the random password of appropriate entropy. The random password will be shared by all users on the device, for all forms of user entropy. When the random password is not already encrypted, encrypt the random password with the DevicePrivateKey and store the random password in the keychain. Then, the device may include the raw, decrypted version of the random password as additional entropy to be used as an input for the password derivation function alongside each type of user entropy.

To access and use the private key, the device may retrieve reference information relating to the DevicePrivateKey from the trusted execution environment; retrieve the encrypted DevicePassword from the keychain and decrypt it with the DevicePrivateKey; include the decrypted version of the random password as additional entropy to be passed to the password derivation function alongside the chosen user entropy; and retrieve the key for use.

To wipe information for all users, the device may instruct the trusted execution environment to delete the stored private key such as, for example, the DevicePrivateKey. By deleting the DevicePrivateKey, the DevicePassword may no longer be decrypted. The symmetric key may no longer be derived for any user entropy, for any user, as the necessary material is no longer available. Additionally, when the DevicePassword is not encrypted by the DevicePrivateKey and simply stored, a malicious user may copy the payload before a wipe and restore the payload after a wipe to render the wipe moot. In the present embodiment, a malicious user may not be able to copy and restore the DevicePrivateKey due to the protections afforded by the trusted execution environment, preventing such an attack vector.

In another exemplary embodiment, a wipe of all users in a single app may be enabled whilst maintaining the data of other apps, on the same device, for all users. This embodiment may add additional requirements and operate within the encryption system previous disclosed in the present application.

To establish a private key, when a key is not already present in the trusted execution environment, the device may generate and store a private key such as, for example, a SharedAppPrivateKey in the trusted execution environment of the device. The generating and storing of the private key may be private to the application performing the private key generation process. The private key may not be protected with additional mechanisms such as, for example, an app password. The private key may be shared by all users of the app on the device.

When a random password is not already present, generate a random password such as, for example, a SharedAppPassword containing a predetermined level of entropy. The random password may be shared by all users of the app on the device. When the random password is not already encrypted, encrypt the random password by using the corresponding public key of the SharedAppPrivateKey and store the encrypted payload in the keychain. Then, generate a random password such as, for example, a UserAppPassword containing a predetermined level of entropy. The UserAppPassword may be unique to a specific user in the specific app. The device may encrypt the UserAppPassword by using the UserPrivateKey and store the encrypted payload in the keychain. The device may pass the decrypted versions of the random password and the UserAppPassword as entropy to be used as an input by the password derivation function to derive a symmetric key. The above process may then be appended to previous disclosures in the present application to complete key establishment and storage.

To access and use the private key, the device may gain access to the UserPrivateKey by using any of the previous disclosures in the present application. The device may then retrieve the encrypted UserAppPassword and decrypt the UserAppPassword with the UserPrivateKey; retrieve reference information relating to the SharedAppPrivateKey; retrieve the encrypted SharedAppPassword and decrypt the SharedAppPassword with the SharedAppPrivateKey; pass the decrypted versions of the UserAppPassword and the SharedAppPassword as entropy to be used as an input for the password derivation function to derive a symmetric key; use the encryption system to decrypt the UserAppPrivateKey-Password by using the DerivedSymmetricKey; retrieve the reference information for the UserAppPrivateKey providing the decrypted password as the app password; and use the UserAppPrivateKey by utilizing the reference information.

To wipe information for all users in one app, the device may instruct the trusted execution environment to delete a stored private key such as, for example, the SharedAppPrivateKey for the targeted app. By deleting the SharedAppPrivateKey, the application may no longer be able to decrypt the SharedAppPassword, which may be the required entropy for deriving the symmetric key used in the encryption system to decrypt the app password of the UserAppPrivateKey for any user of the app. Further, all users in all other apps on the same device may remain unaffected by such a deletion.

In another exemplary embodiment, to wipe all data from a single user on a single device, the user device may locate the user device master key. The user device may then delete the user device master key. The deletion of the user device master key may not require the decryption of the user device master key. As the user device master key is stored on the user device, deletion of the user device master key may render all data encrypted using the user device master key inaccessible. The inability to decrypt the encrypted data may effectively wipe the encrypted data for the user on the user device. The encrypted data may still be stored on the user device.

In another exemplary embodiment, to wipe all data from all users of a single device, the user device may locate the device master key. The user device may then delete the device master key. The deletion of the device master key may not require decryption of the device master key.

As the device master key is stored on the user device, deletion of the device master key may render all data encrypted using keys derived from the device master key inaccessible. The inability to decrypt the encrypted data may effectively wipe the encrypted data for all of the users on the user device. The encrypted data may still be stored on the user device.

Figures

Figure 6:
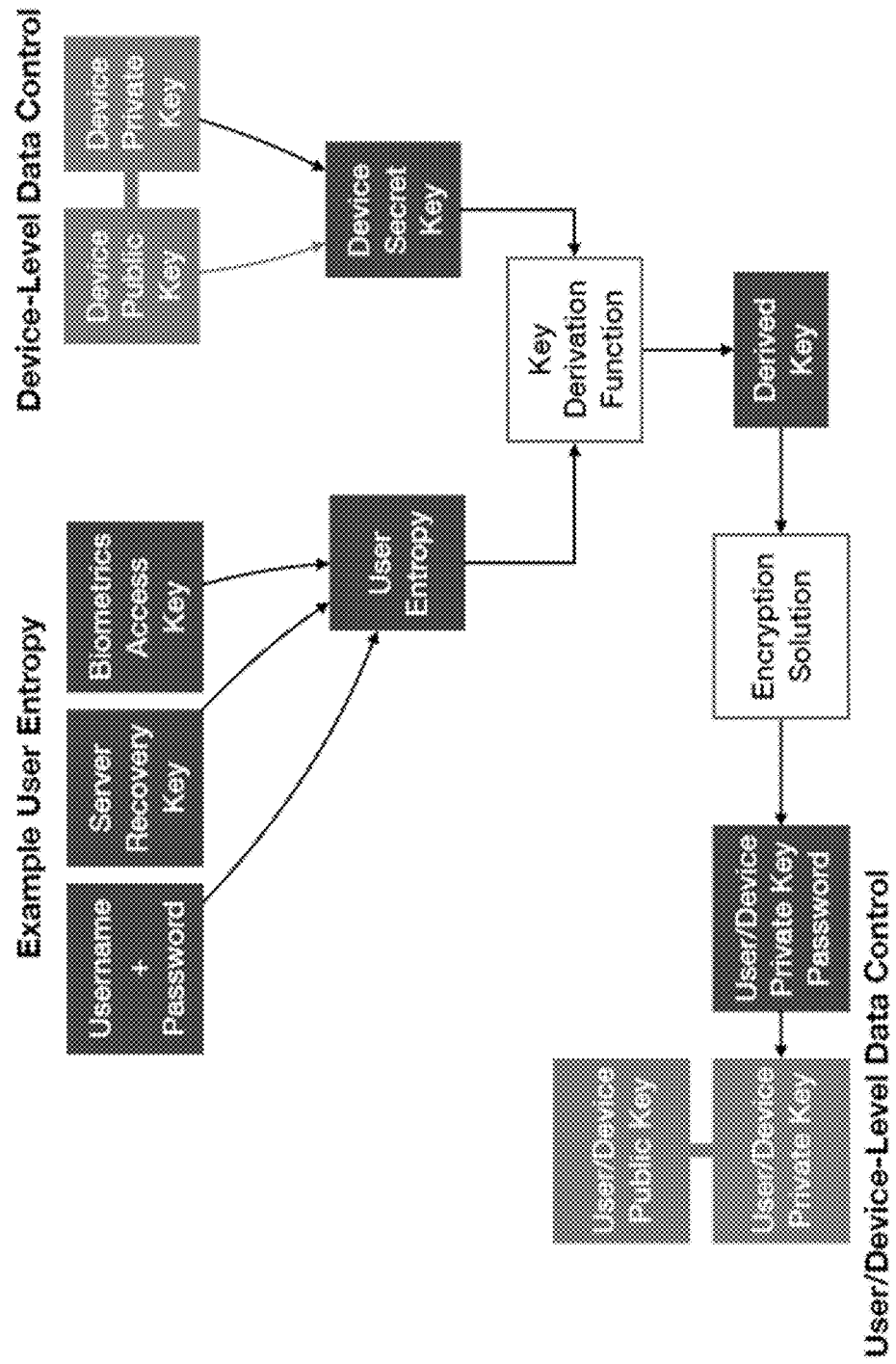
FIG. 6 is a device level flowchart of an exemplary process for implementing a method of asymmetric cryptography for securing access to a private key generated and stored within a trusted execution environment of a device.

FIG. 6 is a device level flowchart 600 of an exemplary process for implementing a method of asymmetric cryptography for securing access to a private key generated and stored within a trusted execution environment of a device. FIG. 6 illustrates the interaction between device-level data control, example user entropy, and user/device-level data control.

Device-level data control may include a device secret key. The device secret key may be derived from an asymmetric pair of a device public key and a device private key. User entropy may include at least one mechanism for securely accessing the private key such as, for example, a username and a password for credential log in, a server recovery key for online credential log in after password change, and a biometrics access key for biometric log in. A key derivation function may use inputs such as, for example, at least one user entropy and the device secret key to generate a derived key. An encryption solution such as, for example, a Triple Data Encryption Standard (Triple DES) algorithm, a Rivest-Shamire-Adleman (RSA) algorithm, a Blowfish algorithm, a Twofish algorithm, and an Advanced Encryption Standard (AES) algorithm may then be used, in conjunction with the derived key, for user/device-level data control including user/device public key, user/device private key, and user/device private key password.

Figure 7:
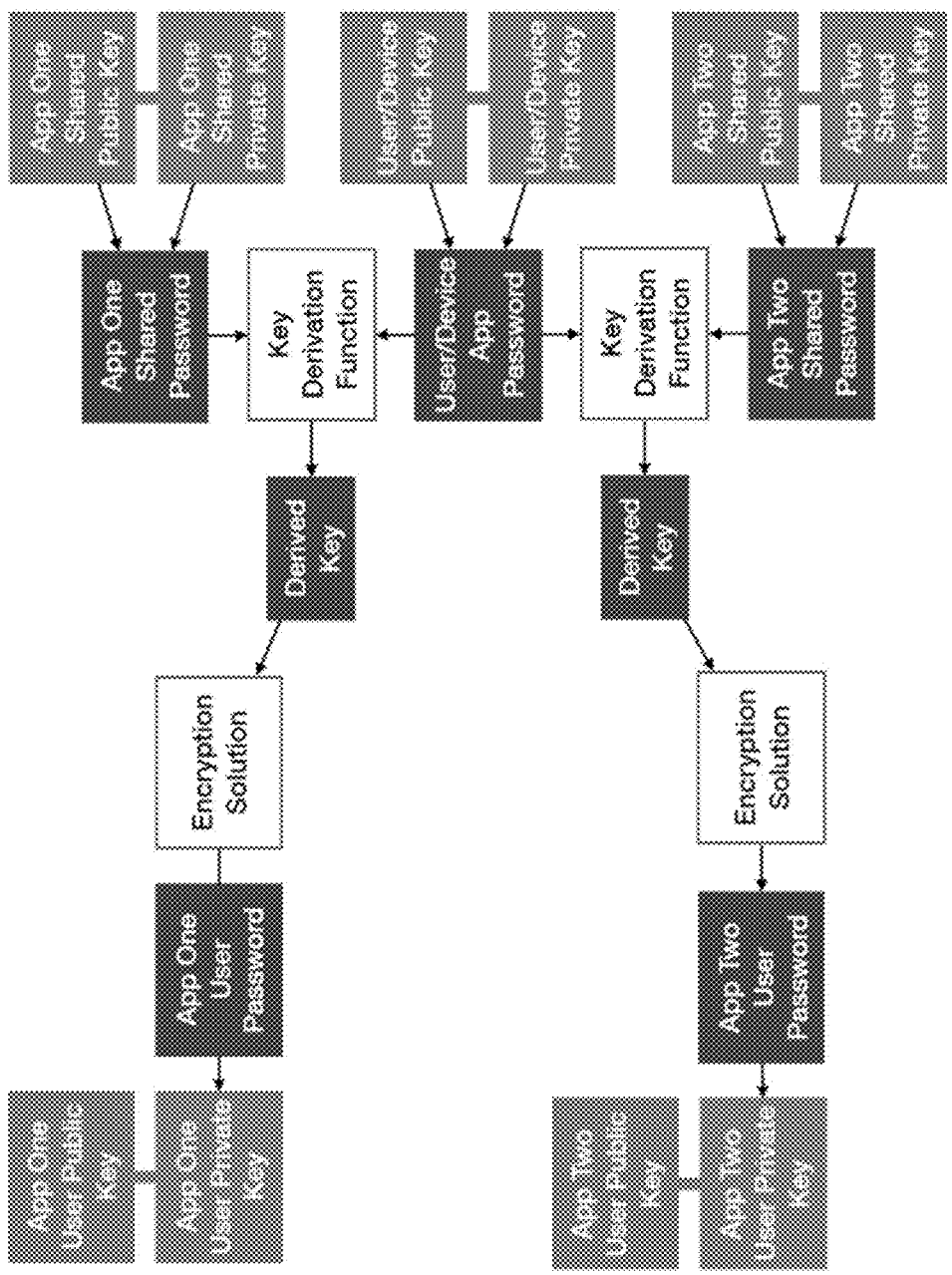
FIG. 7 is an application-level flowchart of an exemplary process for implementing a method of asymmetric cryptography for securing access to a private key generated and stored within a trusted execution environment of a device.

FIG. 7 is an application-level flowchart 700 of an exemplary process for implementing a method of asymmetric cryptography for securing access to a private key generated and stored within a trusted execution environment of a device. FIG. 7 illustrates application-level interactions of asymmetric keys, two exemplary applications, and stored device keys. The exemplary process illustrated in FIG. 7 shows the separate operational environment of the two exemplary applications and corresponding keys, which may protect all applications from compromise when a key for one application is compromised. The separate operational environment of the two exemplary applications may also enable data to be wiped for a specific application without affecting the other applications.

For the stored device keys, a user/device application password may be derived from a user/device public key and a user/device private key. The derivation process for the stored device keys may be consistent with derivation processes provided for in the present disclosure.

For exemplary application one (app one), an app one shared password may be derived from an app one shared public key and an app one shared private key. A key derivation function derives a derived key for app one by using inputs such as, for example, an app one shared password and the user/device app password. An encryption solution such as, for example, a Triple Data Encryption Standard (Triple DES) algorithm, a Rivest-Shamire-Adleman (RSA) algorithm, a Blowfish algorithm, a Twofish algorithm, and an Advanced Encryption Standard (AES) algorithm may then be used, in conjunction with the derived key for app one, for app one user password, app one user private key, and app one user public key.

For exemplary application two (app two), an app two shared password may be derived from an app two shared public key and an app two shared private key. A key derivation function derives a derived key for app two by using inputs such as, for example, an app two shared password and the user/device app password. An encryption solution such as, for example, a Triple Data Encryption Standard (Triple DES) algorithm, a Rivest-Shamire-Adleman (RSA) algorithm, a Blowfish algorithm, a Twofish algorithm, and an Advanced Encryption Standard (AES) algorithm may then be used, in conjunction with the derived key for app two, for app two user password, app two user private key, and app two user public key.

Figure 8:
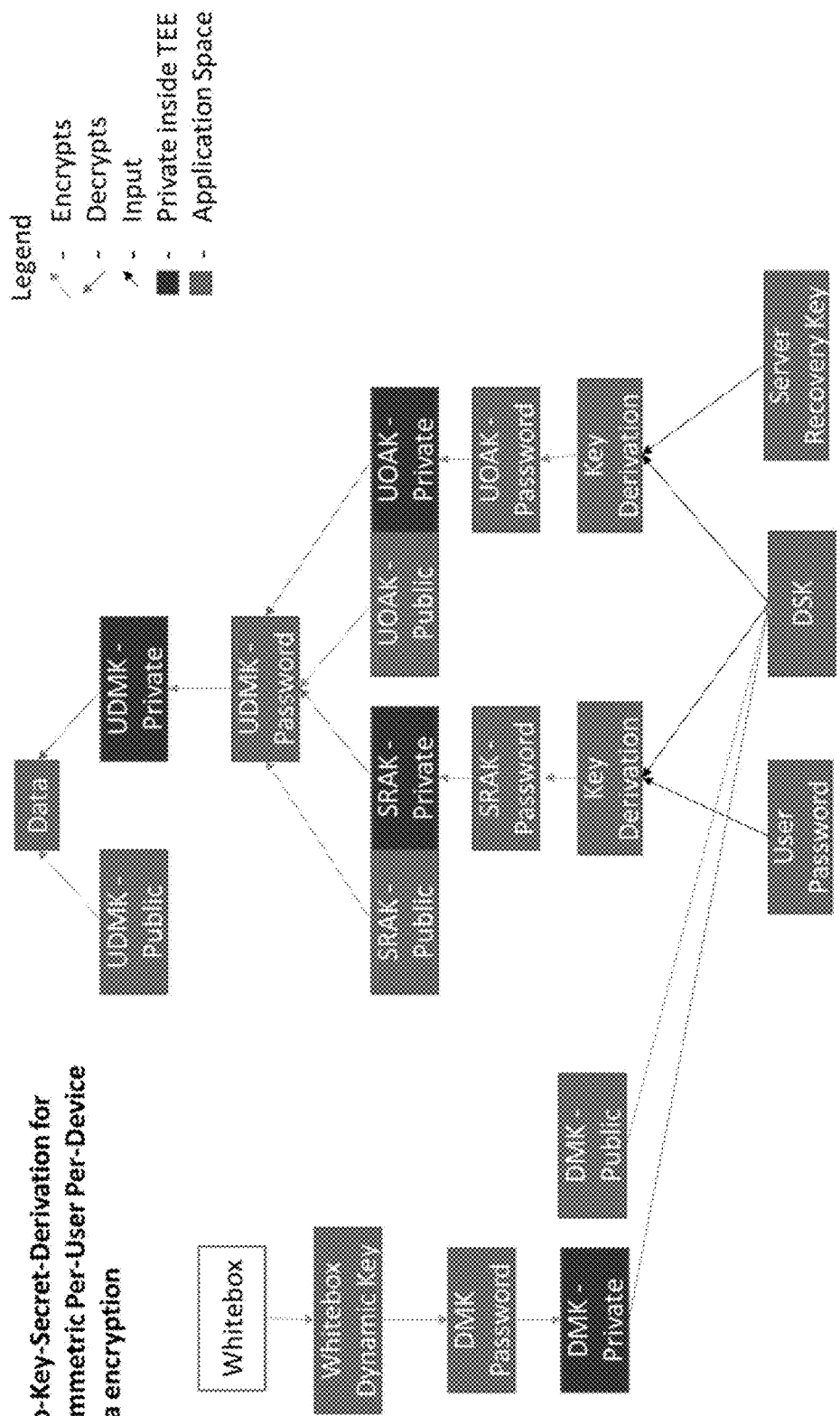
FIG. 8 is an operating environment flowchart of an exemplary process for implementing a method of asymmetric cryptography for securing access to a private key generated and stored within a trusted execution environment of a device.

FIG. 8 is an operating environment flowchart 800 of an exemplary process for implementing a method of asymmetric cryptography for securing access to a private key generated and stored within a trusted execution environment of a device. FIG. 8 illustrates a two key secret derivation for asymmetric per-user, per-device data encryption from an application space as well as within a private trusted execution environment space.

Data requiring encryption may be encrypted by using a public user device master key (UDMK). However, the data may be decrypted by using a private user device master key (UDMK) within a trusted execution environment. A user device master key (UDMK) password may be used to encrypt the private UDMK.

For recovery of the UDMK password, the UDMK password may be encrypted by using a public server recovery access key (SRAK) and decrypted by using a private server recovery access key (SRAK). The private SRAK may be private within the trusted execution environment. The private SRAK may be encrypted by using a server recovery access key (SRAK) password. The SRAK password may be encrypted by using a key derivation function based on inputs such as, for example, a user password and a device secret key (DSK).

For user access of the data, and thus the UDMK password, the UDMK password may be encrypted by using a public user offline access key (UOAK) and decrypted by using a private user offline access key (UOAK). The private UOAK may be private within the trusted execution environment. The private UOAK may be encrypted by using a user offline access key (UOAK) password. The UOAK password may be encrypted by using a key derivation function based on inputs such as, for example, a server recovery key and the DSK.

For derivation of the DSK, the DSK may be encrypted by using a public device master key (DMK) and decrypted by using a private device master key (DMK). The private DMK may be private within the trusted execution environment. The private DMK may be encrypted by using the device master key (DMK) password. The DMK password may be encrypted by using a white-box dynamic key. The white-box dynamic key may be encrypted by using a static key, which may be stored in a white-box cryptographic system.

Figure 9:
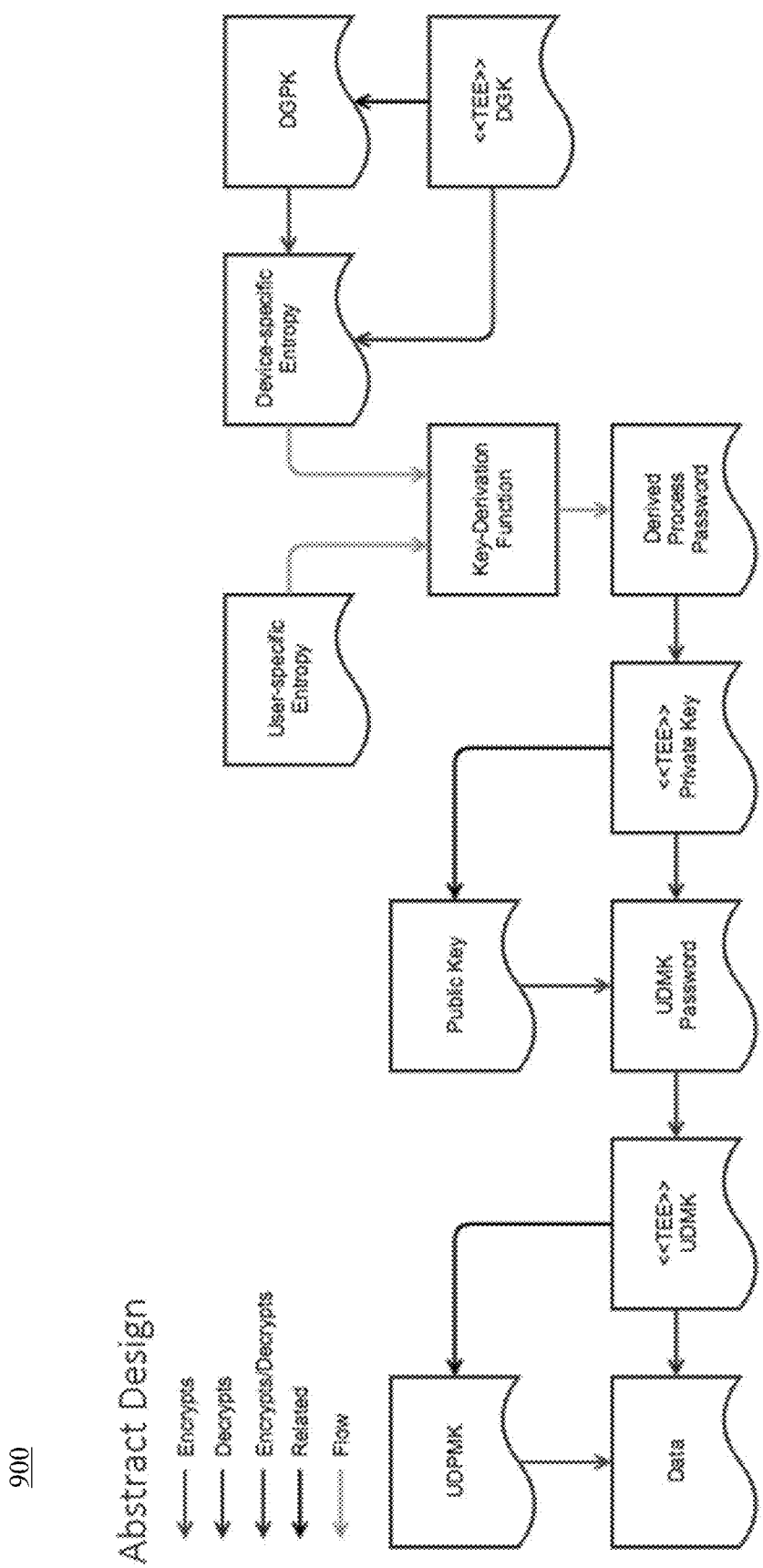
FIG. 9 is a new user/new device flowchart of an exemplary process for implementing a method of asymmetric cryptography for securing access to a private key generated and stored within a trusted execution environment of a device.

FIG. 9 is a new user/new device flowchart 900 of an exemplary process for implementing a method of asymmetric cryptography for securing access to a private key generated and stored within a trusted execution environment of a device. FIG. 9 illustrates an exemplary process for protecting user/device private keys on a multiple user device. On the multiple user device, the intended user may access encrypted data by using an asymmetric key pair stored on the multiple user device when the device is in use by multiple other users.

The exemplary process begins with the generation of a device group key (DGK) within a trusted execution environment of a user device. The DGK may be available to all users on the device. A device password including a predetermined level of user-specific entropy may be generated. A device group password key (DGPK) may be derived from the DGK and may include a predetermined level of device-specific entropy. The device password may then be encrypted by using the DGPK. The encrypted device password may be stored in a password management system such as, for example, a device keychain.

Next, the user entropy may be gathered from a specific user. The user entropy may include, for example, a user password. In an exemplary embodiment, the user password may include a combination of several values such as, for example, a publicly known salt relating to random data that may be used as an additional input to a one-way function that hashes data, hashes a password, and hashes a passphrase. A key derivation function may be used to combine inputs such as, for example, the gathered user entropy and the device password to generate a derived process password. In another exemplary embodiment, the derived process password may not be stored and may be derived when needed.

Then, a user device master key (UDMK) password process protection key relating to a new asymmetric key pair may be generated in the trusted execution environment of the user device. A private key of the UDMK password process protection key may be encrypted by using the derived process password. A UDMK password may also be generated with a predetermined level of entropy. The UDMK password may be encrypted by using the public key of the UDMK password process protection key. The encrypted UDMK password may then be stored in a password management system such as, for example, a device keychain.

Finally, a user device master key (UDMK) and a user device public master key (UDPMK) may be generated in the trusted execution environment. The user device master key may then be encrypted by using the user device master key password. The generated asymmetric key pair may now be used by an application to encrypt and decrypt data. The public key component of the asymmetric key pair may be shared with predetermined parties allowing for the sending of encrypted content for access by the specific user on the multiple user device.

Additional Embodiments

In an exemplary embodiment, the process provided in the present disclosure for establishing an asymmetric key pair may include a first authentication process such as, for example, a single-factor authentication process for securing access to a given system that identifies the party requesting access via only one category of credentials. In another exemplary embodiment, the process provided in the present disclosure for establishing an asymmetric key pair may include a second authentication process such as, for example, a multi-factor authentication process in which a computer user may be granted access only after successfully presenting two or more pieces of factors such as, for example, knowledge that only the user knows, possession of something only the user has, and an inherence of the user to an authentication mechanism.

In another exemplary embodiment, the on device storing of keys may include a migration of the stored keys from one key encryption schema to another key encryption schema in situations such as, for example, when a user has multiple devices with different operational environments. The on device storing of keys may also include a rotation of the stored keys relating to retiring an encryption key and replacing the retired encryption key by generating a new cryptographic encryption key.

In another exemplary embodiment, the process provided in the present disclosure for establishing an asymmetric key pair may enable secure device to device sharing of data without the need of server coordination. In another exemplary embodiment, the process provided in the present disclosure for establishing an asymmetric key pair may be utilized in conjunction with a public key protocol such as, for example, a Diffie-Hellman algorithm for securely exchanging cryptographic keys over a public channel.

In another exemplary embodiment, keys stored within a trusted execution environment may be protected by an additional password provided by an application operating on the user device. The additional password may include a randomly generated password that is stored once per access type. The randomly generated password may be encrypted by using derived keys and may only be accessible using at least one user entropy. To encrypt and decrypt data with the additional password, the trusted execution environment may generate an ephemeral public/private key pair that may be used to derive symmetric keys and to process data using an encryption solution such as, for example, an Advanced Encryption Standard-Galois/Counter Mode (AES-GCM).

Accordingly, with this technology, an optimized process of asymmetric cryptography for securing access to a private key generated and stored within a trusted execution environment of a device is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A cryptographic method for securing access to a private key generated and stored in a device, the method being implemented by at least one processor, the method comprising:

generating, by the at least one processor, at least one application password relating to a predetermined level of entropy;

generating, by the at least one processor within a trusted execution environment relating to a key manager in a secure area of the at least one processor, at least one user private key secured by using the at least one application password;

receiving, by the at least one processor from a user via an input device, at least one user entropy relating to a unique identifier for the user;

deriving, by the at least one processor using a password derivation function, at least one symmetric key based on the at least one user entropy;

encrypting, by the at least one processor using an encryption system, the at least one application password by using the at least one symmetric key;

storing, by the at least one processor in a memory, at least one device payload component relating to the at least one application password and the at least one symmetric key in a password management system;

generating, by the at least one processor within a trusted execution environment, a device secret key that is shared by all users of the device;

deriving, by the at least one processor, the at least one symmetric key based on a random device password that is protected by the device secret key and a password that is protected by the at least one user entropy;

receiving, by the at least one processor via a communication interface, at least one wipe request to destroy data that correspond to the user; and deleting, by the at least one processor via the trusted execution environment, at least one from among the user private key, the device secret key, and an application secret key that corresponds to the at least one wipe request to prevent decryption of the data.

2. The method of claim 1, the method further comprising:

receiving, by the at least one processor via a communication interface, at least one request to use the user private key, the at least one request including the at least one user entropy and at least one action;

deriving, by the at least one processor using the password derivation function, the at least one symmetric key based on the received at least one user entropy;

decrypting, by the at least one processor using the encryption system, the at least one application password by using the derived at least one symmetric key;

retrieving, by the at least one processor from within the trusted execution environment, reference information relating to the at least one user private key by using the decrypted at least one application password; and using, by the at least one processor, the reference information to instruct the trusted execution environment to perform the action.

3. The method of claim 1, wherein the at least one user private key remains within the trusted execution environment.

4. The method of claim 1, wherein the trusted execution environment includes a hardware-based key manager that is isolated from the at least one processor.

5. The method of claim 1, wherein the password management system includes a device keychain.

6. The method of claim 1, wherein the at least one user entropy includes at least one from among a username, a password, a randomly generated password from an authenticated request, and a randomly generated password that is accessible when user presence has been verified via biometrics.

7. The method of claim 1, wherein the at least one wipe request includes at least one from among a single-user wipe request to destroy a first data set that is associated with a single user, a multi-user wipe request to destroy a second data set that is associated with a plurality of users of the device, and a per application wipe request to destroy a third data set that is associated with an application.

8. The method of claim 1, wherein the at least one user private key remains accessible in the trusted execution environment by using an alternate source of user entropy when the unique identifier that corresponds to the user is changed.

9. The method of claim 1, wherein a server recovery key is obtained from a networked repository by using at least one authentication technique to validate the user identity, the at least one authentication technique including a multi-factor authentication technique.

10. A computing device configured to implement an execution of a cryptographic method for securing access to a private key generated and stored in a device, the computing device comprising:
a processor;
a memory; and
a communication interface coupled to each of the processor and the memory,
wherein the processor is configured to:
generate at least one application password relating to a predetermined level of entropy;
generate, within a trusted execution environment relating to a key manager in a secure area of the processor, at least one user private key secured by using the at least one application password;
receive, from a user via an input device, at least one user entropy relating to a unique identifier for the user;
derive, by using a password derivation function, at least one symmetric key based on the at least one user entropy;
encrypt, by using an encryption system, the at least one application password by using the at least one symmetric key;
store, in the memory, at least one device payload component relating to the at least one application password and the at least one symmetric key in a password management system;
generate, within a trusted execution environment, a device secret key that is shared by all users of the device;
derive the at least one symmetric key based on a random device password that is protected by the device secret key and a password that is protected by the at least one user entropy;
receive, via the communication interface, at least one wipe request to destroy data that correspond to the user; and
delete, via the trusted execution environment, at least one from among the user private key, the device secret key, and an application secret key that corresponds to the at least one wipe request to prevent decryption of the data.

11. The computing device of claim 10, wherein the processor is further configured to:
receive, via the communication interface, at least one request to use the user private key, the at least one request including the at least one user entropy and at least one action;
derive, by using the password derivation function, the at least one symmetric key based on the received at least one user entropy;
decrypt, by using the encryption system, the at least one application password by using the derived at least one symmetric key;
retrieve, from within the trusted execution environment, reference information relating to the at least one user private key by using the decrypted at least one application password; and
use the reference information to instruct the trusted execution environment to perform the action.

12. The computing device of claim 10, wherein the processor is further configured to retain the at least one user private key within the trusted execution environment.

13. The computing device of claim 10, wherein the trusted execution environment includes a hardware-based key manager that is isolated from the at least one processor.

14. The computing device of claim 10, wherein the password management system includes a device keychain.

15. The computing device of claim 10, wherein the at least one user entropy includes at least one from among a username, a password, a randomly generated password from an authenticated request, and a randomly generated password that is accessible when user presence has been verified via biometrics.

16. The computing device of claim 10, wherein the at least one wipe request includes at least one from among a single-user wipe request to destroy a first data set that is associated with a single user, a multi-user wipe request to destroy a second data set that is associated with a plurality of users of the device, and a per application wipe request to destroy a third data set that is associated with an application.

17. The computing device of claim 10, wherein the processor is further configured to retain access to the at least one user private key from the trusted execution environment by using an alternate source of user entropy when the unique identifier that corresponds to the user is changed.

18. The computing device of claim 10, wherein the processor is further configured to obtain a server recovery key from a networked repository by using at least one authentication technique to validate the user identity, the at least one authentication technique including a multi-factor authentication technique.

* * * * *